(12) United States Patent
Qian (10) Patent No.: US 12,006,092 B2
(45) Date of Patent: Jun. 11, 2024

(54) STEEL-PIPE-EMBEDDED STRUCTURE FOR PACKAGING AND TRANSPORTATION BOX OF REEL

(71) Applicant: SUZHOU HEXIN NEW MATERIAL CO., LTD., Jiangsu (CN)

(72) Inventor: Xiaoren Qian, Jiangsu (CN)

(73) Assignee: SUZHOU HEXIN NEW MATERIAL CO., LTD., Jiangsu (CN)

( * ) Notice: Subject to any disclaimer, the term of this patent is extended or adjusted under 35 U.S.C. 154(b) by 0 days.

(21) Appl. No.: 18/134,610

(22) Filed: Apr. 14, 2023

(65) Prior Publication Data
US 2024/0101308 A1 Mar. 28, 2024

Related U.S. Application Data

(63) Continuation of application No. PCT/CN2023/080955, filed on Mar. 11, 2023.

(30) Foreign Application Priority Data

Sep. 23, 2022 (CN) .......................... 202222518783.5

(51) Int. Cl.
*B65D 19/00* (2006.01)
*B65D 19/42* (2006.01)

(52) U.S. Cl.
CPC ........... *B65D 19/004* (2013.01); *B65D 19/42* (2013.01); *B65D 2519/00024* (2013.01);
(Continued)

(58) Field of Classification Search
CPC ................. B65D 19/42; B65D 19/004; B65D 2519/00718; B65D 2519/00781; B65D 2519/0096
(Continued)

(56) References Cited

U.S. PATENT DOCUMENTS 5,042,396 A * 8/1991 Shuert ................ B65D 19/0012
248/618
5,117,762 A * 6/1992 Shuert ................ B65D 19/0022
108/57.25
(Continued)

FOREIGN PATENT DOCUMENTS

CN 1603084 A 4/2005
CN 108910222 A 11/2018
(Continued)

OTHER PUBLICATIONS

International Search Report of Corresponding Application No. PCT/CN2023/080955; Jul. 1, 2023; 5 Pgs.

*Primary Examiner* — Jose V Chen
(74) *Attorney, Agent, or Firm* — Cooper Legal Group, LLC (57) ABSTRACT

The present application relates to a steel-pipe-embedded structure for a packaging and transportation box of a reel, and relates to a field of a pallet of the packaging and transportation box of the reel, which includes a pallet body embedded with a steel pipe and integrally formed with a steel pipe channel for receiving the steel pipe, in which both ends of the steel pipe channel are closed. In the present application, because the steel pipe can support the pallet body, a strength and a bearing capacity of the pallet body can be effectively improved. Further, a possibility of deformation caused by long term use is reduced, and an exposure of the steel pipe can be effectively avoided, so that a corrosion of the steel pipe is effectively reduced.

5 Claims, 4 Drawing Sheets

(52) U.S. Cl.
CPC .............. *B65D 2519/00034* (2013.01); *B65D 2519/00044* (2013.01); *B65D 2519/00069* (2013.01); *B65D 2519/00273* (2013.01); *B65D 2519/00293* (2013.01); *B65D 2519/00318* (2013.01); *B65D 2519/00781* (2013.01); *B65D 2519/0096* (2013.01)

(58) Field of Classification Search
USPC ...................................................... 108/57.25
See application file for complete search history.

(56) References Cited

U.S. PATENT DOCUMENTS

| | | | | |
|---|---|---|---|---|
| 5,413,052 A | * | 5/1995 | Breezer .............. | B65D 19/0012 108/57.33 |
| 5,791,262 A | * | 8/1998 | Knight .............. | B65D 19/0012 108/57.25 |
| 5,845,588 A | * | 12/1998 | Gronnevik ......... | B65D 19/0048 108/57.25 |
| 10,286,943 B1 | * | 5/2019 | Greenblatt ............. | B65D 19/42 |
| 2004/0159266 A1 | * | 8/2004 | Fisch ....................... | B29C 49/20 108/57.25 |
| 2006/0201402 A1 | * | 9/2006 | Moore ............... | B65D 19/0038 108/57.25 |
| 2007/0163473 A1 | * | 7/2007 | Shuert ............... | B65D 19/0016 108/57.25 |
| 2008/0210140 A1 | * | 9/2008 | Valentinsson ...... | B65D 19/0014 108/51.11 |
| 2009/0188412 A1 | * | 7/2009 | Dubois .............. | B65D 19/0022 108/57.29 |
| 2009/0236809 A1 | * | 9/2009 | Carver ..................... | B60T 1/14 280/43.12 |
| 2009/0241461 A1 | * | 10/2009 | Linares ................ | B65D 19/004 52/592.1 |
| 2010/0187782 A1 | * | 7/2010 | Facey ....................... | B60T 1/14 280/30 |
| 2011/0005436 A1 | | 1/2011 | Lee | |
| 2011/0120353 A1 | * | 5/2011 | Jensen ............... | B65D 19/0073 108/57.25 |
| 2011/0259249 A1 | * | 10/2011 | Ogburn .............. | B65D 19/0038 108/57.33 |
| 2012/0160734 A1 | * | 6/2012 | Linares .............. | B65D 19/0028 206/386 |
| 2013/0032507 A1 | * | 2/2013 | Du Toit ............. | B65D 19/0018 206/599 |
| 2014/0277955 A1 | * | 9/2014 | Eidelson ................... | B66F 9/20 701/50 |
| 2015/0135999 A1 | * | 5/2015 | Takyar ................... | B65D 19/06 108/53.3 |
| 2016/0244204 A1 | * | 8/2016 | DeBattiste ................ | B66C 1/12 |
| 2017/0081075 A1 | * | 3/2017 | Bruce ..................... | B29C 49/00 |
| 2017/0327271 A1 | * | 11/2017 | Spadavecchia .... | B65D 19/0014 |
| 2018/0037058 A1 | * | 2/2018 | Saito ................... | B60B 33/0026 |
| 2021/0039830 A1 | * | 2/2021 | Kalinowski .......... | B65D 19/004 |
| 2021/0147112 A1 | * | 5/2021 | Cohen ................ | B65D 19/004 |
| 2022/0250793 A1 | * | 8/2022 | Daubenspeck ...... | B65D 19/004 |

FOREIGN PATENT DOCUMENTS

| | | |
|---|---|---|
| CN | 111256403 A | 6/2020 |
| CN | 111776420 A | 10/2020 |
| CN | 112141487 A | 12/2020 |
| CN | 114056715 A | 2/2022 |
| CN | 217321199 U | 8/2022 |
| CN | 218229838 U | 1/2023 |
| GB | 2103573 A | 2/1983 |
| WO | WO-2018144861 A1 * | 8/2018 ......... B65D 19/0016 |

* cited by examiner

STEEL-PIPE-EMBEDDED STRUCTURE FOR PACKAGING AND TRANSPORTATION BOX OF REEL

CROSS-REFERENCE TO RELATED APPLICATION

This application is a continuation of PCT application serial no. PCT/CN2023/080955, filed on Mar. 11, 2023, which claims the priority and benefit of Chinese patent application serial no. 202222518783.5, filed on Sep. 23, 2022. The entireties of PCT application serial no. PCT/CN2023/080955 and Chinese patent application serial no. 202222518783.5 are hereby incorporated by reference herein and made a part of this specification.

TECHNICAL FIELD

The present application relates to a field of a pallet for a packaging and transportation box of a reel, in particular, to a steel-pipe-embedded structure for the packaging and transportation box of the reel.

BACKGROUND ART

A plastic pallet is a logistics unit that is used together with logistics equipment such as a forklift and a shelf, and can be used to store, bear, and transport goods, and is one of essential logistics equipment in modern logistics warehousing. The plastic pallet is a best product emerged to meet a need of environmental protection, and can reduce a damage to forest by replacing a wooden pallet, and is an inevitable product adapting to a development of logistics industry.

A reel is used for reeling, storing and transporting various optical films, high performance films, metallic foils and high-grade paper products. In particular, a transport box formed by the plastic pallet and a plastic cover is used to bear the reel. A product reeled and stored by the reel will contact with a surface of the pallet, during transportation, the product is easy to be damaged because of a friction with the pallet. In existing technologies, the pallet is defined with a clamping groove, which is provided with a clamping plate, and a mandrel of the reel is provided at the clamping plate, so that the reel does not contact with the pallet, and the clamping plate can effectively fix the reel. However, the existing plastic pallet for accommodating the reel has a limited bearing capacity, it is difficult to bear a weight of the reel after long term use, thus the plastic pallet is prone to deformation and difficult to be used for a long time.

SUMMARY

In order to solve a problem that a plastic pallet is prone to deformation after long term use, the present application provides a steel-pipe-embedded structure for a packaging and transportation box of a reel.

The steel-pipe-embedded structure for the packaging and transportation box of the reel provided in the present application adopts the following technical solutions:

The steel-pipe-embedded structure for the packaging and transportation box of the reel includes the structure includes a pallet body embedded with a steel pipe and integrally formed with a steel pipe channel for receiving the steel pipe, wherein both ends of the steel pipe channel are closed.

In the above technical solutions, before producing the pallet body, first the steel pipe is placed in a pallet body mould, then an injection mould processing is performed, so that the steel pipe is embedded in the pallet body, and the steel pipe channel for receiving the steel pipe is formed in the pallet body. Finally, the pallet body is taken out by opening mould. Because the steel pipe can support the pallet body, a strength of the pallet body is effectively improved and further a bearing capacity of the pallet body is effectively improved. Thus, a possibility of deformation caused by long term use is reduced, and an exposure of the steel pipe can be effectively avoided, so that a corrosion of the steel pipe is effectively reduced.

In one specific embodiment, the pallet body is provided with a plurality of legs arranged along a periphery of the pallet body; a side of the pallet body away from the legs is defined with a plurality of positioning grooves configured for mounting a clamping plate or inserting the legs of an adjacent pallet body therein; a side of the pallet body close to the legs is provided with a support leg staggering the legs; and the pallet body is defined with a fixing groove for inserting an adjacent support leg therein.

In the above technical solutions, by providing the positioning grooves in the pallet body, the clamping plate can be fixedly mounted on the pallet body, so that the pallet body can bear the reel more stably. By providing the positioning grooves and the fixing groove, which are used for inserting the legs and the support leg into when storing the pallet body, a stacking space is reduced, which is convenient for storage, further a storage space is saved.

In one specific embodiment, a side wall of each of the positioning grooves and the fixing groove is provided with a plurality of air grooves configured for exhausting an air when inserting the legs and the support leg into the positioning grooves and the fixing groove.

In the above technical solutions, by utilizing the air grooves and a groove, when the pallet bodies are stored by stacking, the air generated when inserting the legs and the support leg into the positioning grooves and the fixing groove can be exhausted; and when it is needed to use the pallet body, it helps to separate the stacked pallet bodies, thereby an effort and time required for stacking the pallet bodies are saved.

In one specific embodiment, the side of the pallet body away from the legs is defined with a plurality of mounting grooves configured for mounting a plastic cover and arranged along a periphery of the pallet body; each of the mounting grooves is in communication with each of the positioning grooves; and a side wall of each of the positioning grooves is provided with a bump, which is arranged along the periphery of the pallet body.

In the above technical solutions, when mounting the plastic cover, the plastic cover is inserted into the mounting grooves and abuts against the bump, which helps the plastic cover to be firmly mounted on the pallet body.

In one specific embodiment, the side of the pallet body close to the legs is provided with a support including two side plates; the side plates are rotatably connected with a rotating rod passing through the two side plates respectively; each of the side plates is provided with a positioning assembly for locking the rotating rod, and the rotating rod is provided with a lifting assembly located between the two side plates; a side of the lifting assembly away from the rotating rod is provided with a universal wheel, and the lifting assembly is configured for lifting and lowering the universal wheel; and a fixing assembly for locking the lifting assembly is provided on the side plates.

In the above technical solutions, before moving the pallet body, the fixing assembly and the positioning assembly are opened, the rotating rod rotates to drive the lifting assembly to rotate, and further to drive the universal wheel to rotate. When the universal wheel rotates to a target position, the rotating rod is locked by using the positioning assembly, then the lifting assembly is moved, so that the universal wheel can be lifted and lowered. When the universal wheel is lifted and lowered to the target position, the lifting assembly is locked by using the fixing assembly, so that the universal wheel can be placed on the ground. When it is needed to move the pallet body, a sliding function of the universal wheel can be achieved, so that a convenience of moving the pallet body can be improved. In stationary, the universal wheel can be folded up, so that the pallet body can be placed on the ground stably.

In one specific embodiment, the positioning assembly includes a locking block positioned at a side of each of the side plates close to an end of the rotating rod; the locking block is defined with a locking groove for inserting the rotating rod therein, and the end of the rotating rod is defined with a locking hole; a bottom wall of the locking groove is fixedly connected with a locking rod inserted into the locking hole; a side of each of the side plates away from the locking block is provided with a locking screw passing through the side plates and being in threaded connection with the locking block; and each of the side plates abuts against an outer wall of the locking block by the locking screw.

In the above technical solutions, the locking screw is unscrewed, and the locking block is removed, so that the locking rod is separated from the locking hole. Then, the rotating rod rotates to the target position, the locking rod in inserted into the locking hole, and the rotating rod is inserted into the locking groove. The locking screw is tightened, so that each of the side plates abuts against the outer wall of the locking block by the locking screw. Thus, the rotating rod can rotate to drive the universal wheel to rotate, further the sliding function of the universal wheel can be achieved. It can also lock the rotating rod.

In one specific embodiment, the lifting assembly includes a lifting rod for lifting and lowering the universal wheel, an end of the lifting rod is fixedly connected with the universal wheel, and an end of the lifting rod away from the universal wheel is in threaded connection with the rotating rod.

In the above technical solutions, by utilizing the threaded connection between the lifting rod and the rotating rod of the universal wheel, the lifting rod rotates to adjust a relative position between the lifting rod and the rotating rod, and further allows to adjust a position of the universal wheel. Thus, the universal wheel is placed on the ground, and the sliding function of the universal wheel is achieved.

In one specific embodiment, the fixing assembly includes a fixing rod for fixing the side plates and the lifting rod; the lifting rod is defined with a plurality of limiting channels, and the fixing rod passes through one of the limiting channels and the two side plates; and each end of the fixing rod is provided with a fixing nut passing through the fixing rod and abutting against one of the side plates.

In the above technical solutions, before lifting and lowering the universal wheel, the fixing nut is unscrewed, and the fixing rod is removed to be separated from the limiting channel and the side plates. After the lifting rod is adjusted to the target position, the fixing rod passes through the side plates and the limiting channel, then the fixing nut is tightened, so that the fixing rod can be fixed on the side plates. Thus, the lifting rod is locked, so that the lifting rod is more stable during sliding.

In summary, the present application has one of the following beneficial technical effects:

1. for the steel-pipe-embedded structure for the packaging and transportation box of the reel provided in the present application, by adding the steel pipe, a problem of deformation caused by long term use can be solved. Before producing the pallet body, first the steel pipe is placed in a pallet body mould, then an injection mould processing is performed, so that the steel pipe is embedded in the pallet body, and the steel pipe channel for receiving the steel pipe is formed in the pallet body. Finally, the pallet body is taken out by opening mould. Because the steel pipe can support the pallet body, the strength of the pallet body is effectively improved and further a bearing capacity of the pallet body is effectively improved. Thus, the possibility of deformation caused by long term use is reduced, and an exposure of the steel pipe can be effectively avoided, so that the corrosion of the steel pipe is effectively reduced;

2. for the steel-pipe-embedded structure for the packaging and transportation box of the reel provided in the present application, by providing the positioning grooves and the fixing groove in the pallet body, which are used for inserting the legs and the support leg into when storing the pallet body. By providing the air grooves and a groove, the air generated when inserting the legs and the support leg into the positioning grooves and the fixing groove can be exhausted; and when it is needed to use the pallet body, it helps to separate the stacked pallet bodies. Thus, the stacking space is reduced, which is convenient for storage, further the storage space is saved; and, 3. for the steel-pipe-embedded structure for the packaging and transportation box of the reel provided in the present application, by adding the universal wheel on the pallet body, the universal wheel, it is convenient for a movement and use of the pallet body. Before moving the pallet body, the fixing assembly and the positioning assembly are opened, the rotating rod rotates to drive the lifting assembly to rotate, and further to drive the universal wheel to rotate. When the universal wheel rotates to the target position, the rotating rod is locked by using the positioning assembly, then the lifting assembly is moved, so that the universal wheel can be lifted and lowered. When the universal wheel is lifted and lowered to the target position, the lifting assembly is locked by using the fixing assembly, so that the universal wheel can be placed on the ground. When it is needed to move the pallet body, the sliding function of the universal wheel can be achieved, so that the convenience of moving the pallet body can be improved. In stationary, the universal wheel can be folded up, so that the pallet body can be placed on the ground stably.

DETAILED DESCRIPTION

The present application is further described in detail below in combination with FIGS. 1-5.

Embodiment 1

Figure 1:
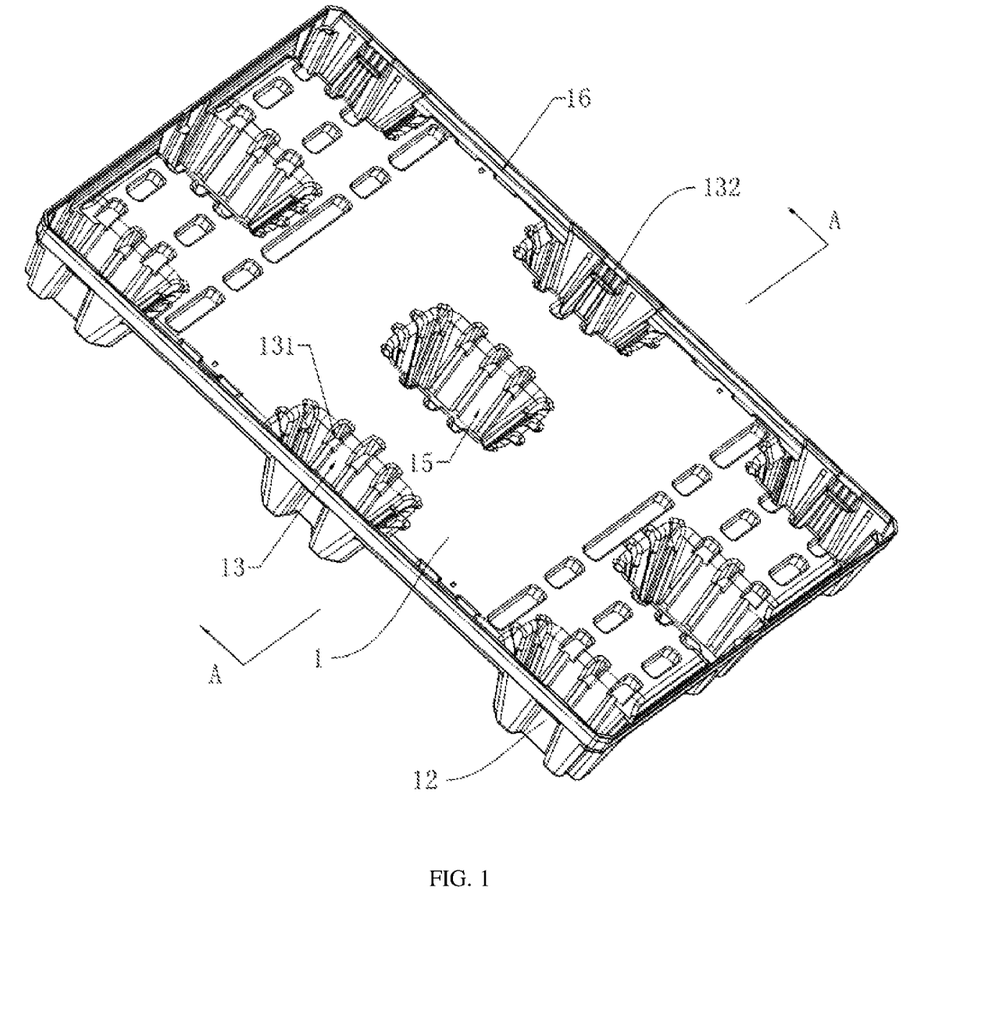
FIG. 1 is a structural diagram of a steel-pipe-embedded structure for a packaging and transportation box of a reel in embodiment 1 of the present application.
Figure 2:
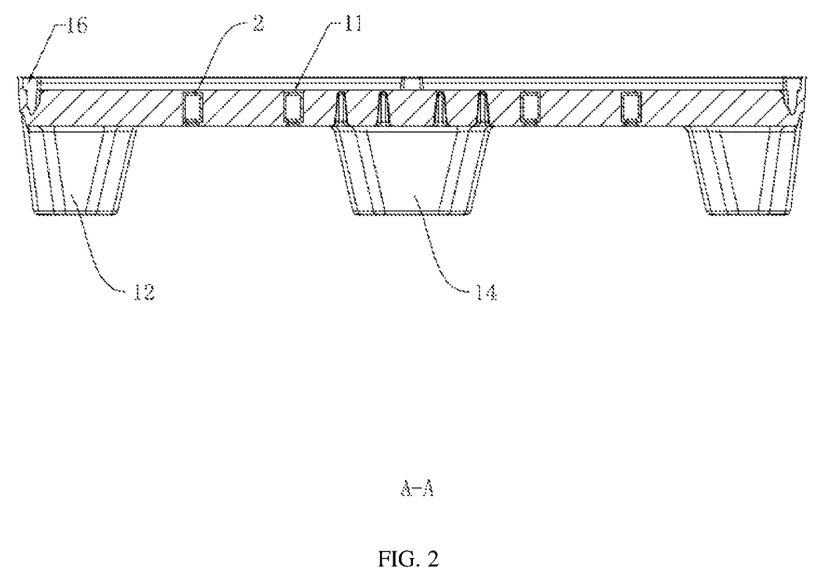
FIG. 2 is a sectional view along line A-A in FIG. 1.

Referring to FIGS. 1-2, a steel-pipe-embedded structure for a packaging and transportation box of a reel includes a pallet body 1. In this embodiment, a cross section of the pallet body 1 is rectangular and is embedded with a steel pipe 2. In this embodiment, the steel pipe 2 is four hollow steel pipes. The pallet body 1 is integrally formed with a steel pipe channel 11 for receiving the steel pipe 2. In this embodiment, an outer wall of the steel pipe 2 abuts against an inner wall of the steel pipe channel 11, and both ends of the steel pipe channel 11 are closed. Before producing the pallet body 1, first the steel pipe 2 is placed in a pallet body mould, then an injection mould processing is performed, so that the steel pipe 2 is embedded in the pallet body 1, and the steel pipe channel 11 for receiving the steel pipe 2 is formed in the pallet body 1. Finally, the pallet body 1 is taken out by opening mould. Because of a providing of the steel pipe 2, which can support the pallet body 1, a strength of the pallet body 1 is effectively improved and further a bearing capacity of the pallet body 1 is effectively improved. Thus, a possibility of deformation caused by long term use is reduced, and an exposure of the steel pipe 2 can be effectively avoided, so that a corrosion of the steel pipe 2 is effectively reduced.

Referring to FIG. 1, the pallet body 1 is provided with a plurality of legs 12 arranged along a periphery of the pallet body 1. In this embodiment, there are eight legs evenly arranged along a periphery of the pallet body 1. A side of the pallet body 1 away from the legs 12 is defined with a plurality of positioning grooves 13 configured for mounting a clamping plate or inserting the leg 12 of an adjacent pallet body 1 therein. In this embodiment, there are eight positioning grooves 13 arranged correspondingly to the legs 12. A side of the pallet body 1 close to the legs 12 is provided with a support leg 14 staggering the legs 12. In this embodiment, there is one support leg 14 positioned at a center of the pallet body 1. The pallet body 1 is defined with a fixing groove 15 for inserting an adjacent support leg 14 therein. In this embodiment, there is one fixing groove 15 arranged correspondingly to the support leg 14.

By providing the legs 12 at the pallet body 1, when the pallet body 1 is placed on a ground, the legs 12 are placed on the ground, thus an abrasion caused by a friction between the pallet body 1 and the ground is effectively reduced. By providing the positioning grooves 13 in the pallet body 1, the clamping plate can be fixedly mounted on the pallet body 1, so that the pallet body 1 can bear the reel more stably. By providing the positioning grooves 13 and the fixing groove 15, which are used for inserting the legs 12 and the support leg 14 into when storing the pallet body 1, a stacking space is reduced, which is convenient for storage, further a storage space is saved.

Referring to FIG. 1, a side wall of each of the positioning grooves 13 and the fixing groove 15 is defined with a plurality of air grooves 131 configured for exhausting an air when inserting the legs 12 and the support leg 14 into the positioning grooves 13 and the fixing groove 15. When the pallet bodies 1 are stored by stacking, the legs 12 is inserted into the positioning grooves 13, and the support leg 14 is inserted into the fixing groove 15. At this time, due to a presence of the air, the adjacent pallet bodies 1 are difficult to be inserted for stacking. By providing the air grooves 131, an extra air in the positioning grooves 13 and the fixing groove 15 can be exhausted, which helps to stack the adjacent pallet bodies 1 and to save a manpower and time required for stacking the pallet bodies 1.

Referring to FIG. 1 and FIG. 2, the side of the pallet body 1 away from the legs 12 is defined with a plurality of mounting grooves 16 configured for mounting a plastic cover and arranged along the periphery of the pallet body 1. In this embodiment, there are eight mounting grooves 16 positioned between the two adjacent positioning grooves 13. Each of the mounting grooves 16 is in communication with each of the positioning grooves 13. A side wall of each of the positioning grooves 13 is provided with a bump 132 arranged along the periphery of the pallet body 1. When mounting the plastic cover, the plastic cover is inserted into the mounting grooves 16 and abuts against the bump 132, which helps the plastic cover to be firmly mounted on the pallet body 1.

An implementation principle of Embodiment 1 is as follows. Before producing the pallet body 1, first the steel pipe 2 is placed in the pallet body mould, then the injection mould processing is performed, so that the steel pipe 2 is embedded in the pallet body 1, and the steel pipe channel 11 for receiving the steel pipe 2 is formed in the pallet body 1. Finally, the pallet body 1 is taken out by opening mould. When using the pallet body 1, the legs is placed on the ground, the clamping plate is inserted into the positioning grooves 13, then the reel is placed on the clamping plate, and finally the plastic cover is inserted into the mounting grooves 16 and abuts against the bump 132. During this process, the steel pipe 2 provided inside the pallet body 1 can support the pallet body 1, which helps the pallet body 1 to bear the reel. Thus, the strength of the pallet body 1 is effectively improved and further the bearing capacity of the pallet body 1 is effectively improved. Thus, the possibility of deformation caused by long term use is reduced. When the pallet bodies 1 are stored by stacking, the legs 12 and the support leg 14 of one of the pallet bodies 1 can be inserted into the positioning grooves 13 and the fixing groove 15 of another one of the pallet bodies 1, thus the stacking space is reduced, which is convenient for storage. During this process, the extra air in the positioning grooves 13 and the fixing groove 15 can be exhausted through the air grooves 131, which helps to separate the stacked pallet bodies 1 when it is needed to use the pallet body 1, thereby an effort and time required for stacking the pallet bodies 1 are saved.

Embodiment 2

Figure 3:
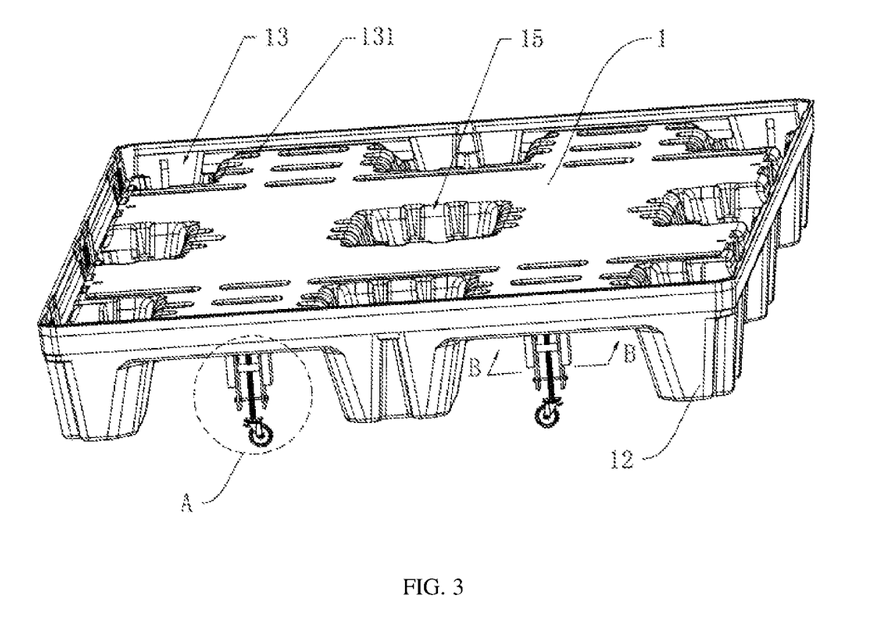
FIG. 3 is a structural diagram of the steel-pipe-embedded structure for the packaging and transportation box of the reel in embodiment 2 of the present application.
Figure 4:
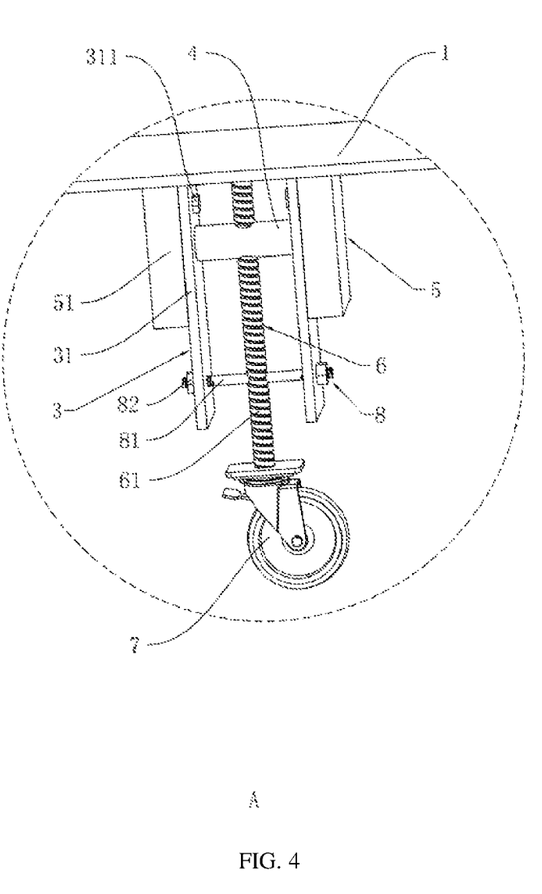
FIG. 4 is an enlarged view of part A in FIG. 3.

Referring to FIG. 3 and FIG. 4, a difference between this embodiment and Embodiment 1 is that, the side of the pallet body 1 close to the legs 12 is provided with a support 3. In this embodiment, there are four groups of the side plates 31. The pallet body 1 is fixedly connected with the support 3, and the side plates 31, the legs 12 and the support leg 14 are staggered. The support 3 includes two side plates 31, and in this embodiment, each of the side plates 31 is a rectangular plate. The side plates 31 are rotatably connected with a rotating rod 4, and in this embodiment, the rotating rod 4 is a cylindrical rod. The rotating rod 4 passes through the two side plates 31 respectively. Each of the side plates 31 is provided with a positioning assembly 5 for locking the rotating rod 4, and in this embodiment, there are two groups of the positioning assemblies 5. The positioning assembly 5 and an end of the rotating rod 4 are in one-to-one correspondence. The rotating rod 4 is provided with a lifting assembly 6 located between the two side plates 31; a side of the lifting assembly 6 away from the rotating rod 4 is provided with a universal wheel 7, and the lifting assembly 6 is configured for lifting and lowering the universal wheel 7. A fixing assembly 8 for locking the lifting assembly 6 is provided on the side plates 31.

Before moving the pallet body 1, first, the fixing assembly 8 and the positioning assembly 5 are opened, the rotating rod 4 rotates to drive the lifting assembly 6 to rotate, and further to drive the universal wheel 7 to rotate. When the universal wheel 7 rotates to a target position, the positioning assembly 5 is closed to lock the rotating rod 4, then the lifting assembly 6 is moved, so that the universal wheel 7 can be lifted and lowered. When the universal wheel 7 is lifted and lowered to the target position, the fixing assembly 8 is closed to lock the lifting assembly 6, so that the universal wheel 7 can be placed on the ground. When it is needed to move the pallet body 1, a sliding function of the universal wheel 7 can be achieved, so that a convenience of moving the pallet body 1 can be improved. In stationary, the universal wheel 7 can be folded up, so that the pallet body 1 can be placed on the ground stably. In a daily work, the pallet body 1 is moved by using a forklift generally, which requires a large operation space and there are many safety hazards. In this embodiment, by adding the universal wheel 7, an operation is convenient and fast, and the time and the effort are saved, thereby facilitating a daily movement of the pallet body 1, saving an operation space required for moving the pallet body 1, and reducing the safety hazards during movement.

Figure 5:
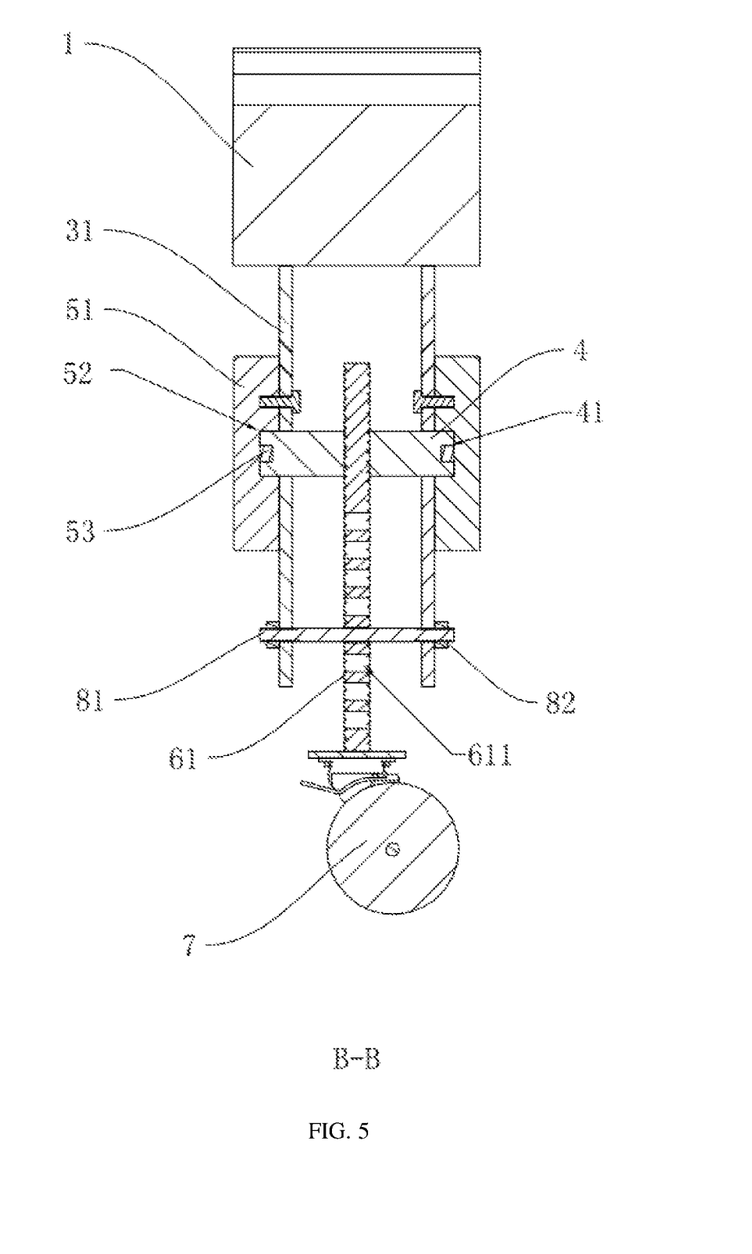
FIG. 5 is a sectional view along line B-B in FIG. 3.

Referring to FIG. 4 and FIG. 5, the positioning assembly 5 includes a locking block 51 positioned at a side of each of the side plates 31 close to an end of the rotating rod 4, and in this embodiment, there are two locking blocks 51. The locking block 51 is arranged coaxially with the rotating rod 4. The locking block 51 is defined with a locking groove 52 for inserting the rotating rod 4 therein, and the end of the rotating rod 4 is defined with a locking hole 41. In this embodiment, each end of the rotating rod 4 is defined with the locking hole 41, which is a square hole. A bottom wall of the locking groove 52 is fixedly connected with a locking rod 53, and in this embodiment, the locking rod 53 is a square rod. The locking rod 53 is inserted into the locking hole 41, and in this embodiment, the locking rod 53 is embedded in the locking hole 41. A side of each of the side plates 31 away from the locking block 51 is provided with a locking screw 311 passing through the side plates 31 and being in threaded connection with the locking block 51. Each of the side plates 31 abuts against an outer wall of the locking block 51 by the locking screw 311. Before moving the pallet body 1, first, the locking screw 311 is unscrewed, and the locking block 51 is removed, so that the rotating rod 4 is separated from the locking groove 52, and the locking rod 53 is separated from the locking hole 41. Then, the rotating rod 4 is rotated to the target position, the locking rod 53 in inserted into the locking hole 41, and the end of the rotating rod is inserted into the locking groove 52. The locking screw 311 is tightened, so that each of the side plates 31 abuts against the outer wall of the locking block 51 by the locking screw 311. Thus, the rotating rod 4 can rotate to drive the universal wheel 7 to rotate, further the sliding function of the universal wheel 7 can be achieved. It can also lock the rotating rod 4.

Referring to FIG. 4 and FIG. 5, the lifting assembly 6 includes a lifting rod 61 for lifting and lowering the universal wheel 7, and in this embodiment, the lifting rod 61 is a cylindrical rod with screw thread. An end of the lifting rod 61 is fixedly connected with the universal wheel 7, and an end of the lifting rod 61 away from the universal wheel 7 is in threaded connection with the rotating rod 4. In this embodiment, the lifting rod 61 passes through the rotating rod 4. Before moving the pallet body 1, the lifting rod 61 is unscrewed, which allows to adjust a relative position between the lifting rod 61 and the rotating rod 4, and further allows to adjust a position of the universal wheel 7. The universal wheel 7 contacts the ground and there is a certain distance between the legs 12 and the ground, thus the universal wheel 7 can achieve the sliding function, and the abrasion caused by a contact between the legs 12 and the ground during movement is effectively reduced.

Referring to FIG. 4 and FIG. 5, the fixing assembly 8 includes a fixing rod 81 for fixing the side plates 31 and the lifting rod 61, and in this embodiment, the fixing rod 81 is the cylindrical rod with screw thread. The lifting rod 61 is defined with a plurality of limiting channels 611 configured for fixing the lifting rod 61 that is lifted and lowered to different positions by using the fixing rod 81. The fixing rod 81 passes through one of the side plates 31, one of the limiting channels 611 and another one of the side plates 31 successively. In this embodiment, the fixing rod 81 is located at one side of a part of the lifting rod 61 close to the universal wheel 7. Each end of the fixing rod 81 is provided with a fixing nut 82 passing through the fixing rod 81 and abutting against one of the side plates 31. Before lifting and lowering the universal wheel 7, the fixing nut 82 is unscrewed, and the fixing rod 81 is removed to be separated from the limiting channel 611 and the side plates 31. After the lifting rod 61 is adjusted to the target position, the fixing rod 81 passes through the side plates 31 and the limiting channel 611, then the fixing nut 82 is tightened, so that the fixing rod 81 can be fixed on the side plates 31. Thus, a purpose of adjusting the lifting rod 61 is achieved, and the lifting rod 61 is locked, so that the lifting rod 61 is more stable during sliding.

An implementation principle of Embodiment 2 is as follows. Before moving the pallet body 1, the fixing nut 82 is unscrewed, and the fixing rod 81 is removed to be separated from the limiting channel 611 and the side plates 31. Then, the locking screw 311 is unscrewed, and the locking block 51 is removed, so that the rotating rod 4 is separated from the locking groove 52, and the locking rod 53 is separated from the locking hole 41. The rotating rod 4 is rotated to the target position, the locking rod 53 in inserted into the locking hole 41, and the end of the rotating rod is inserted into the locking groove 52. The locking screw 311 is tightened, so that each of the side plates 31 abuts against the outer wall of the locking block 51 by the locking screw 311. After that, the lifting rod 61 is unscrewed, and the relative position between the lifting rod 61 and the rotating rod 4 is adjusted to make the universal wheel 7 contact the ground, and there is a certain distance between the legs 12 and the ground. Finally, the fixing rod 81 passes through the side plates 31 and the limiting channel 611, then the fixing nut 82 is tightened, so that the fixing rod 81 can be fixed on the side plates 31. After completing the above process, the sliding function of the universal wheel 7 can be achieved, so that the movement of the pallet body 1 can be achieved, thereby facilitating the daily movement of the pallet body 1.

The above are the preferred embodiments of the present application, which are not intended to limit the protection scope of the present application. Therefore, all equivalent changes made according to the structure, shape and principle of the present application should be covered within the protection scope of the present application.

LISTING OF REFERENCE SIGNS 1. pallet body; 11. steel pipe channel; 12. leg; 13. positioning groove; 131. discharge groove; 132. bump; 14. support leg; 15. fixing groove; 16. mounting groove; 2. steel pipe; 3. support; 31. side plate; 311. locking screw; 4. rotating rod; 41. locking hole; 5. positioning assembly; 51. locking block; 52. locking groove; 53. locking rod; 6. lifting assembly; 61. lifting rod; 611. limiting channel; 7. universal wheel; 8. fixing assembly; 81. fixing rod; 82. fixing nut.

What is claimed is:

1. A steel-pipe-embedded structure for a packaging and transportation box of a reel, wherein, the steel-pipe-embedded structure comprises a pallet body embedded with a steel pipe and integrally formed with a steel pipe channel for receiving the steel pipe, wherein both ends of the steel pipe channel are closed, wherein the pallet body is provided with a plurality of legs arranged along a periphery of the pallet body; a side of the pallet body away from the plurality of legs is defined with a plurality of positioning grooves configured for mounting a clamping plate or inserting a plurality of legs of an adjacent pallet body within the plurality of positioning grooves; a second side of the pallet body close to the plurality of legs is provided with a support leg staggering the plurality of legs; and the pallet body is defined with a fixing groove for inserting an adjacent support leg therein, wherein the second side of the pallet body close to the plurality of legs is provided with a support comprising two side plates; the two side plates are rotatably connected with a rotating rod passing through the two side plates respectively; each of the two side plates is provided with a positioning assembly for locking the rotating rod, and the rotating rod is provided with a lifting assembly located between the two side plates; a side of the lifting assembly away from the rotating rod is provided with a universal wheel, and the lifting assembly is configured for lifting and lowering the universal wheel; and a fixing assembly for locking the lifting assembly is provided on the two side plates, wherein the lifting assembly comprises a lifting rod for lifting and lowering the universal wheel, an end of the lifting rod is fixedly connected with the universal wheel, and a second end of the lifting rod away from the universal wheel is in threaded connection with the rotating rod.

2. The steel-pipe-embedded structure for the packaging and transportation box of the reel according to claim 1, wherein, a side wall of each of the plurality of positioning grooves and the fixing groove is provided with a plurality of air grooves configured for exhausting air when inserting the plurality of legs and the support leg into the plurality of positioning grooves and the fixing groove.

3. The steel-pipe-embedded structure for the packaging and transportation box of the reel according to claim 2, wherein, the side of the pallet body away from the plurality of legs is defined with a plurality of mounting grooves configured for mounting a plastic cover and arranged along the periphery of the pallet body; each of the plurality of mounting grooves is in communication with each of the plurality of positioning grooves; and the side wall of each of the plurality of positioning grooves is provided with a bump, which is arranged along the periphery of the pallet body.

4. The steel-pipe-embedded structure for the packaging and transportation box of the reel according to claim 1, wherein, the positioning assembly comprises a locking block positioned at a side of each of the two side plates close to an end of the rotating rod; the locking block is defined with a locking groove for inserting the rotating rod in the locking groove, and the end of the rotating rod is defined with a locking hole; a bottom wall of the locking groove is fixedly connected with a locking rod inserted into the locking hole; a side of each of the two side plates away from the locking block is provided with a locking screw passing through the two side plates and being in threaded connection with the locking block; and each of the two side plates abuts against an outer wall of the locking block by the locking screw.

5. The steel-pipe-embedded structure for the packaging and transportation box of the reel according to claim 1, wherein, the fixing assembly comprises a fixing rod for fixing the two side plates and the lifting rod; the lifting rod is defined with a plurality of limiting channels, and the fixing rod passes through one of the plurality of limiting channels and the two side plates; and each end of the fixing rod is provided with a fixing nut passing through the fixing rod and abutting against one of the two side plates.

* * * * *